April 9, 1968 W. R. ELLIS Re. 26,369

CLAMP FOR PAPER ROLLS AND THE LIKE

Original Filed July 10, 1963 4 Sheets-Sheet 1

INVENTOR.
WILLIAM R. ELLIS
BY John R. Walker, III
Attorney

CLAMP FOR PAPER ROLLS AND THE LIKE

Original Filed July 10, 1963 4 Sheets-Sheet 2

INVENTOR.
WILLIAM R. ELLIS
BY John R. Walker, III
Attorney

CLAMP FOR PAPER ROLLS AND THE LIKE

Original Filed July 10, 1963 4 Sheets-Sheet 3

INVENTOR.
WILLIAM R. ELLIS
BY John R. Walker, III
Attorney

CLAMP FOR PAPER ROLLS AND THE LIKE

Original Filed July 10, 1963 4 Sheets-Sheet 4

INVENTOR.
WILLIAM R. ELLIS
BY John R. Walker, III
Attorney

United States Patent Office

Re. 26,369
Reissued Apr. 9, 1968

26,369
CLAMP FOR PAPER ROLLS AND THE LIKE

William R. Ellis, 1056 Woodview Drive,
Memphis, Tenn. 38117

Original No. 3,252,609, dated May 24, 1966, Ser. No. 294,029, July 10, 1963. Application for reissue Jan. 25, 1967, Ser. No. 617,432
6 Claims. (Cl. 214—652)

Matter enclosed in heavy brackets [ ] appears in the original patent but forms no part of this reissue specification; matter printed in italics indicates the additions made by reissue.

*ABSTRACT OF THE DISCLOSURE*

*A lift truck with roll handling mechanism for use in handling rolls of paper and the like. The mechanism includes a first plate movably mounted on the mast of the lift truck, a second plate closely spaced in parallel relationship with the first plate, and means rotatably supporting the first plate from the second plate. Roll clamping means including a pair of cooperative clamp arms mounted on the second plate adjacent the front side thereof. The drive means for rotating the second plate is located outside of the space between the first and second plates to permit a close spacing of the first and second plates for a low load center loss.*

This invention relates to a clamp used in conjunction with a lift truck for handling rolls of paper and the like.

Heretofore, in previous devices of the above-mentioned type, the so-called load-center losses have been large. These load-center losses are proportional to the distance of the load-center from the front of the lift truck. Prior devices have had high load-center losses because the previous pattern within the industry has been to stack components, that is, the rotator and the clamp body, one behind the other. A high load-center loss is undesirable since the load-center loss determines the maximum load for a given truck weight that can be carried without the truck being tilted under the weight of the load.

Among other things, the present invention is directed towards reducing the load-center losses inherent in previous devices of this type by replacing the two above-mentioned components by a single clamp device with the front plate of the rotator becoming the frame of the clamp and with the cylinders and guide bars being wrapped behind the front plate of the rotator in overlapping relationship to the rotator itself.

Thus, one of the objects of the present invention is to reduce substantially the load-center losses in devices for handling rolls of paper and the like.

A further object is to provide improved means in such a device for accomplishing the swinging of the longer of the two clamp arms.

A further object is to provide an improved arrangement of the hydraulic system which includes a unique system of passing the hydraulic oil through the centers of the two actuating cylinders of the clamp, thereby eliminating the hose lines to the shoulder of the clamp.

A further object is to provide a unique articulated pad construction on the swinging arm which acts as a mechanical storage of energy so that if the oil pressure is released, the slack will be taken up mechanically.

A further object is eliminate the use of a carriage on the lift truck by bolting the carriage roller brackets to the back of the rotator backplate and extending these into a slot in the channel.

A further object is to provide a device for handling rolls of paper and the like in which there is no necessity for any forward tilt of the forklift truck mast to pick up rolls from the floor due to the unique arrangement of the clamp arms.

A further object is generally to improve the design and construction of devices for handling rolls of paper and the like.

The means by which the foregoing and other objects of the present invention are accomplished and the manner of their accomplishment will be readily understood from the following specification upon reference to the accompanying drawings, in which.

Figure 1:
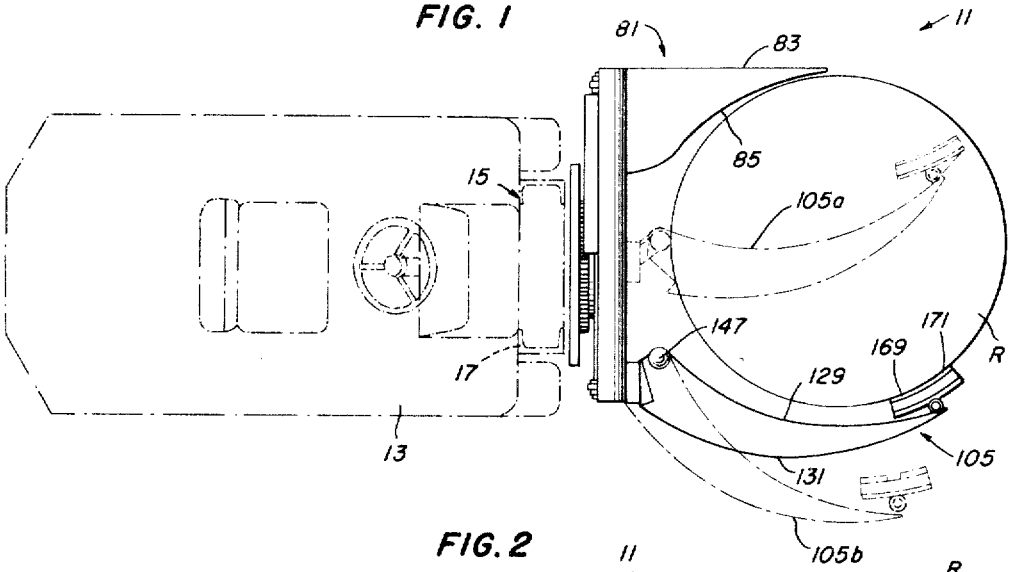
FIG. 1 is a top plan view of the device of the present invention with two other positions of the swinging clamp arm being shown in broken lines, and with the lift truck being shown in broken lines.
Figure 2:
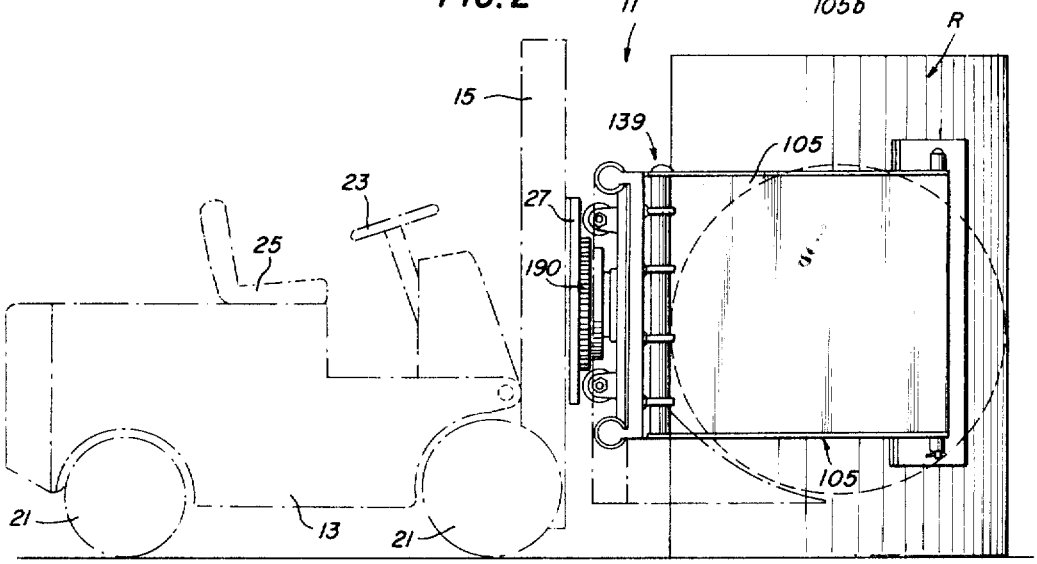
FIGURE 2 is a side elevational view of the same with the paper roll being shown in solid lines in a vertical position and being shown held in a horizontal position in broken lines.
Figure 3:
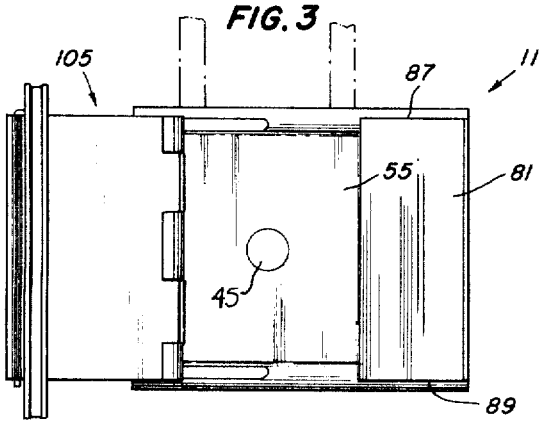
FIG. 3 is a front view of the device of the present invention but with the paper roll being removed from the clamps.

Referring now to the drawings in which the various parts are indicated by reference characters, the roll handling mechanism 11 of the present invention is adapted to be used in conjunction with a lift truck of suitable construction, as, for example, the lift truck 13 shown in FIGS. 1 and 2. Lift truck 13 is preferably a self-powered mobile truck of well-known construction which includes the usual mast 15 adjacent the front part thereof, with the mast including the usual laterally spaced and inwardly facing channel members 17. Mast 15 also includes a hoisting chain 19 which is coupled to suitable power means, not shown, on lift truck 13 to raise and lower chain 19, which in turn raises and lowers roll handling mechanism 11 in a manner which will be better understood in the description to follow later in the specification.

In addition, lift truck 13 includes the usual wheels 21, steering wheel 23, and driver's seat 25. Other details of lift truck 13 are not shown since they are well known to those skilled in the art and form no part of the present invention.

Figure 4:
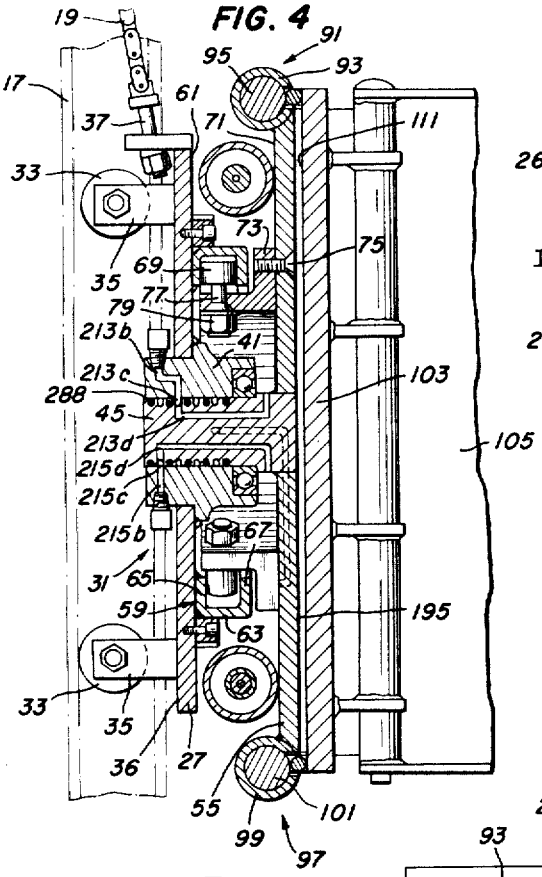
FIG. 4 is an enlarged fragmentary sectional view taken as on a vertical plane through the center of the device of the present invention.
Figure 5:
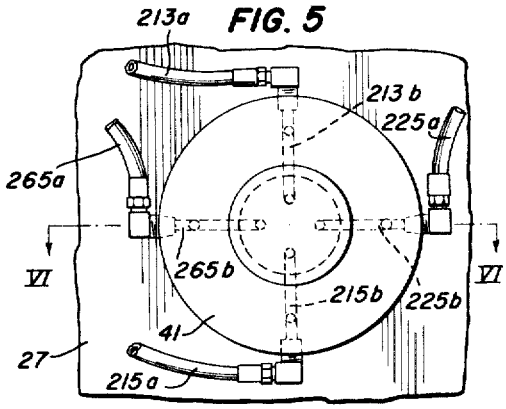
FIG. 5 is a fragmentary view on a further enlarged scale as viewed from the left of FIG. 4.
Figure 6:
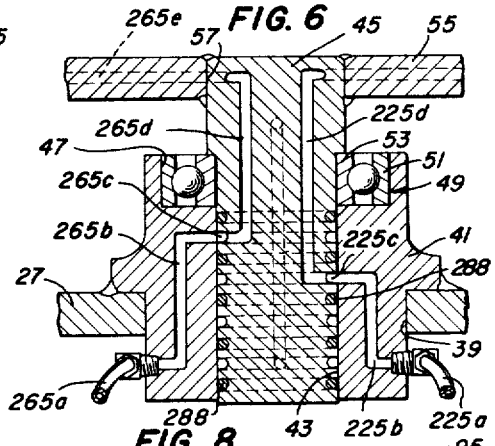
FIG. 6 is a fragmentary sectional view taken as on the line VI—VI of FIG. 5.
Figure 7:
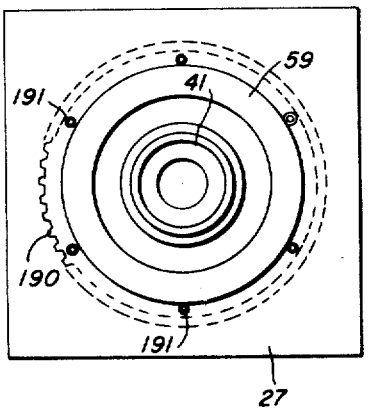
FIG. 7 is an elevational view of the front of the back plate showing the mechanisms attached thereto.
Figure 10:
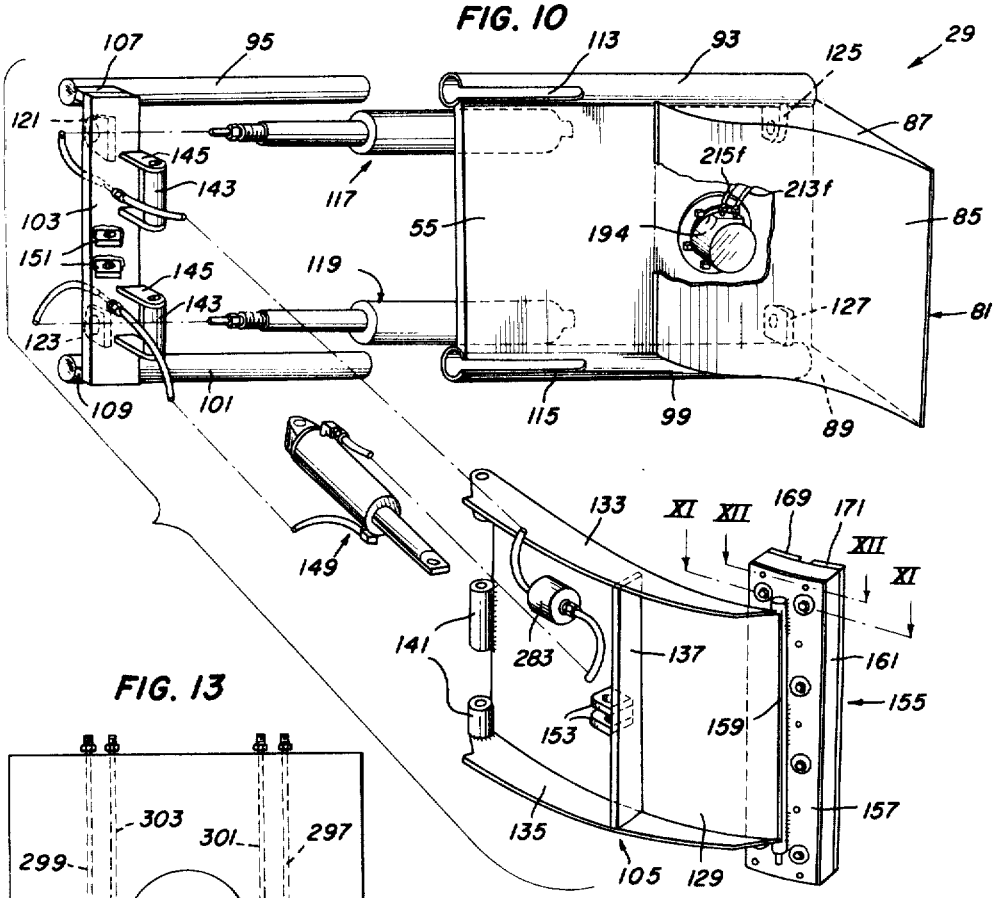
FIG. 10 is an exploded view of the clamping mechanisms of the present invention with their related parts being shown and with parts being broken away and removed for purposes of illustration.

Roll handling mechanism 11 comprises in general a first or back plate 27, best seen in FIGS. 4 and 7; a clamping mechanism 29, best seen in FIG. 10; and a rotation mechanism 31, best seen in FIG. 4, interposed between back plate 27 and clamping mechanism 29. Roll handling mechanism 11 is movably mounted on mast 15 for vertical movement by means of rollers 33 that rollingly engage the flanges of channel members 17 and that are respectively rotatably mounted on brackets 35 which in turn are fixedly attached by suitable means to the back side 36 of back plate 27. Back plate 27 is coupled to the end of chain 19 by suitable means as fastening members 37 so that handling mechanism 11 can be selectively moved upwardly and downwardly by the operator of the lift truck 13. It should be noted, as best seen in FIG. 4, that the back plate 27 is contiguous to channel member 17, which helps to reduce the load-center losses. Also, it should be noted that by having this structure, the usual carriage found on devices of this type is eliminated, thereby further reducing the load-center losses.

Back plate 27 is preferably flat and rectangular in shape, and is provided with a central opening 39 therethrough. A hub 41 extends through opening 39 and is fixedly attached to back plate 27 by suitable means, as by welding. Hub 41 is provided with a central bore 43 therethrough, in which is rotatably mounted a spindle 45. Hub 41 is provided with an annular recess 47 adjacent the forward end of bore 43, and in which recess a bearing ring 49 is received with the outer race 51 of the bearing being fixedly attached to hub 41 and the inner race 53 being fixedly attached to spindle 45 so that the spindle will turn freely in hub 41, about an axis extending substantially perpendicular to back plate 27.

A second or front plate 55 is fixedly attached adjacent the forward end of spindle 45, as by extending the forward end of the spindle through a central bore 57 in front plate 55 and welding the front plate in place. Front plate 55 is substantially flat and rectangular, and is disposed in spaced parallel relationship forwardly of back plate 27.

Figure 8:
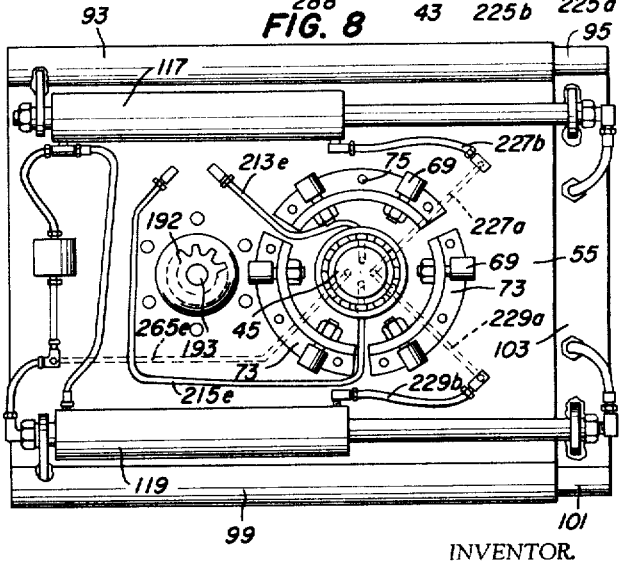
FIG. 8 is a back view of the front plate showing the mechanisms attached thereto.

An annular channel member 59 is mounted, as by welding or the like, on the front side 61 of back plate 27, with the channel member being concentric with spindle 45. Channel member 59 includes the web portion 63 and spaced flanges 65, 67 extending inwardly from adjacent the opposite edges of the web portion. A plurality of rollers 69 rollingly engage one of flanges 65, 67, with the axis of rotation of the rollers extending substantially radially relative to spindle 45. The rollers 69 are rotatably mounted from front plate 55 adjacent the back side 71 thereof as by means of a plurality of segments 73 that are arranged in a circle, as best seen in FIG. 8. The segments are right-angular in cross-section, as best seen in FIG. 4, and are mounted from the back plate 27 as by means of screws 75. Each of the rollers 69 is rotatably supported on one of segments 73 by suitable means as the spindles 77 having a nut 79 threadedly engaged on the end thereof. There are preferably three segments 73 and preferably two rollers 69 rotatably supported from each segment, as best seen in FIG. 8. It will be understood from the foregoing that front plate 55 is firmly rotatably supported relative to back plate 27.

A first, or relatively stationary, clamp arm 81 is fixedly mounted on front plate 55 in spaced relation to the spindle 45. Clamp arm 81 is preferably hollow and includes a substantially flat outer side 83 adjacent the outside edge of front plate 55; an inner side 85 that extends from a place on front plate 55 spaced inwardly from outer side 83 forwardly and arcuately, as best seen in FIG. 1, to a joint with outer side 83 at the forward edge of clamp arm 81; a top 87; and a bottom 89. Arm 81 is rigid and the inner side 85 forms a portion of an imaginary cylinder with a diameter substantially equal to the diameter of the maximum size paper roll R with which the roll handling mechanism 11 is adapted to be used. It will be seen in FIG. 1 that clamp arm 81 extends outwardly to a place which is slightly less than the center of the maximum roll R of paper.

A guide mechanism 91 is provided adjacent the upper edge of front plate 55. Guide mechanism 91 includes an outer guide cylinder 93 fixedly attached to the upper edge of front plate 55 as by welding or the like and an inner guide bar 95 that is slidably and telescopically received in outer guide cylinder 93. Guide mechanism 91 in effect is wrapped around behind front plate 55; that is to say, none of the guide mechanism extends forwardly of the front plate, but rather extends rearwardly thereof, as best seen in FIG. 4. By the use of this structure, it will be understood that an additional reduction in load-center losses is effected. A similar guide mechanism 97 is provided adjacent the lower edge of front plate 55 and arranged in a similar manner to guide mechanism 91, so that it is wrapped around the lower edge of the front plate. Guide mechanism 97, in a similar manner to guide mechanism 91, includes outer guide cylinder 99 and inner guide bar 101.

A shoulder or vertical plate member 103 is provided which acts as the support means for a swinging clamp arm 105 in a manner to be described later in the specification. Vertical plate member 103 is rigidly attached forwardly of inner guide bars 95, 101, and respectively connected thereto by means of the attaching members 107, 109, which are fixedly attached to the rearward side 111 of plate 103 and the forward side of the inner guide bars. In other words, the inner guide bars 95, 101, vertical plate 103, and attaching members 107, 109 form a rigid assembly that is movably mounted relative to the assembly of front plate 55, outer guide cylinders 93, 99, and clamp arm 81, and that is adapted to carry the clamp arm 105 towards and away from clamp arm 81. It will be noted that plate 103 is spaced forwardly of plate 55 and moves across the front thereof. In the front of outer guide cylinders 93, 99 are respectively provided slots 113, 115 that extend from one end of the outer guide cylinders longitudinally thereof for a substantial distance so that spaces are provided for attaching members 107, 709 to move.

The means for the actuation of the above-mentioned movement of plate member 103 with its associated parts relative to front plate 55 and its associated parts, preferably comprise a pair of piston-cylinder assemblies 117, 119 that are respectively connected to plate member 103 at one end as by lugs 121, 123 and are respectively connected to front plate 55 at the opposite ends thereof, as by lugs 125, 127. Piston-cylinder assemblies 117, 119 are located respectively above and below rotation mechanism 31 behind plate 55 and just inwardly of guide mechanisms 91, 97 so that a minimum of space is taken up. The actual hydraulic connections of the piston-cylinder assemblies 117, 119 will be described later in the specification.

Referring now to swinging clamp arm 105, best seen in FIGS. 1, 2 and 10, the clamp arm is preferably of composite construction and includes an arcuate inward side 129, an arcuate outward side 131, top 133, bottom 135, and a brace member 137 interconnecting the other members. Arm 105 is swingably mounted from plate member 103 by a hinge 139 which includes spaced hinge portions 141 that are fixedly attached to the rearward edge of clamp arm 105 and spaced hinge portions 143 that are mounted forwardly from plate member 103 in spaced relationship thereto by means of the supporting members 145. In addition, hinge 135 includes the usual hinge pin 147 extending through hinge portions 141, 143. Thus, clamp arm 105 is swingably mounted in spaced relation to clamp arm 81 for swinging movement towards and away from clamp arm 81. The means for actuating the swinging movement of clamp arm 105 is preferably by the piston-cylinder assembly 149 that is provided on the interior of the clamp arm and is connected at one end to plate member 103 by suitable fastening means which includes lugs 151, and the opposite end is connected to brace 137 by suitable fastening means which includes lugs 153. The actual hydraulic connection of piston-cylinder assembly 149 with the rest of the hydraulic system will be brought out later in the specification.

Figure 12:
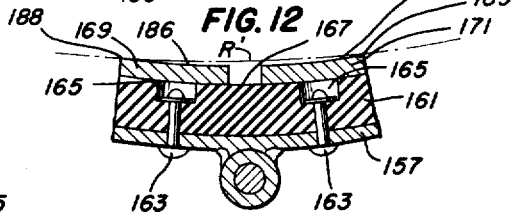
FIG. 12 is an enlarged sectional view taken as on the line XII—XII of FIG. 10.

Clamp arm 105 includes an articulated pad assembly 155 at the outer end thereof. Pad assembly 155 includes a concave rigid backing plate 157 that is pivotally attached along the outer edge of inward side 129 as by means of a hinge 159. In addition, pad assembly 155 includes a resilient cushion 161 of rubber or the like mounted on the inside of backing plate 157 and attached thereto as by means of rivets 163 and extend through aligned apertures in cushion 161 and backing plate 157. The inner ends of rivets 163 are preferably contained in recesses 165 provided in the inner face 167 of resilient cushion 161. Also, pad assembly 155 includes a pair of vertically extending and laterally spaced pads 169, 171 that are respectively mounted against the inner face 167 by a plurality of fastening members 173. Each of the fastening members 173 preferably includes a nut 175 that is fixedly mounted on the back side of the related pad 169 or 171, as by welding or the like, and which fits into a recess 177 in the face 167 of resilient cushion 161. In addition, fastening member 173 includes a washer 179 loosely received in an aperture 181 through backing plate 157. Also, fastening member 173 includes a screw 183 extending through washer 179, through a bore 185 in cushion 161, and threadedly engaged in nut 175. From the above, it can be seen that the pads 169, 171 are resiliently mounted from backing plate 157 and can move slightly relative thereto. The respective roll contacting inner surfaces 186, 187 of pads 169, 171 are arcuate and lie in the outside surface of an imaginary cylinder whose diameter is less than the diameter of the largest roll of paper to be handled and greater than the diameter of the minimum roll to be handled. Thus, when a roll of paper, as, for example, roll R, is first contacted as the clamp arm 105 is moved inwardly, the roll will first be contacted on the outward edges 188, 189 of pads 169, 171, as best seen in FIG. 12 where the broken line R' represents the outside surface of the roll of paper R. Continued inward movement of clamp arm 105 will cause a slight twisting of the pads 169, 171 until the roll contacting surfaces 186, 187 conform to and contact the roll surface R' along substantially the entire surfaces 186, 187. From the foregoing, it will be understood that there is a mechanical storing of energy by the pad assembly 155 so that if the hydraulic oil pressure is slightly released for one reason or another, the resiliently mounted pads 169, 171 will take up the slack.

The entire clamping mechanism assembly 29 shown in FIG. 10, which includes the plate 55, clamp arms 81, 105, and all the parts shown in the figure, is rotatable about an axis extending through spindle 45. The actual means for causing the rotation is preferably as follows:

An annular gear 190 concentric with spindle 45 is fixedly attached as by screws 191 to back plate 27 around channel member 59. A smaller gear 192 engages gear 190 and is fixedly mounted on the shaft 193 of a hydraulic motor 194, which is preferably mounted on the front side 195 of front plate 55 in clamp arm 81, as best seen in FIG. 10, with the shaft 193 extending through an aperture, not shown, in the front plate and with the gear 192 being mounted on the shaft on the back side 71 of the front plate.

The hydraulic system includes a tank 196 located on the lift truck 13 and which contains hydraulic fluid F. Line 197 leads from tank 195 to a pump 199. A line 200 leads from pump 199 with one branch 200a leading to the midpoint of chamber 201 of a control valve 202, and the other branch 200b leading to the midpoint of chamber 203 of another control valve 205. A return line 207 leads from line 200 back to tank 196 through a relief valve 209. Another return line 211 empties into return line 207 and has branches 211a and 211b leading from the opposite ends of chamber 201, and has branches 211c and 211d leading from the opposite ends of chamber 203.

Control valve 205 controls the flow of fluid F to and from hydraulic motor 194 through the passageways 213 and 215 which interconnect motor 194 and chamber 203. Motor 194 is of usual construction so that flow of fluid towards the motor through passageway 213 will cause the motor to be driven in one direction with the oil returning through the passageway 215, and flow of oil through passageway 215 toards the motor with the oil returning by passageway 213 will cause the motor to rotate in the opposite direction. It will be understood that this flow will be determined by the position of the spool-like piston 217 slidably mounted in chamber 203. Piston 217 is movable by means of a lever 219 pivotally mounted from the valve body 221 of valve 205 by a bracket 223. It will be further understood that when the piston 217 is moved to the left as viewed in FIG. 9, the fluid will flow from branch 200b, through chamber 203 between the enlarged portions 217a and 217b of the piston 217, and through the passageway 213. In this position, it will be understood that passageway 213 is uncovered by the enlarged portion 217a being moved to the left and that passageway 215 is uncovered by enlarged portion 217b being moved to the left so that the return oil flow can pass to the right of enlarged portion 217b and through line 211d and the return conduits 211, 207 to tank 196. When piston 217 is moved in the opposite direction or to the right as viewed in FIG. 9, it will be understood that the fluid flow will be from the line 200b through chamber 203 between piston portions 217a and 217b and then through the passageway 215 since the portion 217b will unblock the passageway 215. Also, the passageway 213 will be unblocked by portion 217a moving to the right which will allow return flow of fluid to pass to the left of enlarged portion 217a and out through the branch 211c and return conduits 211, 207 to tank 196.

Figure 9:
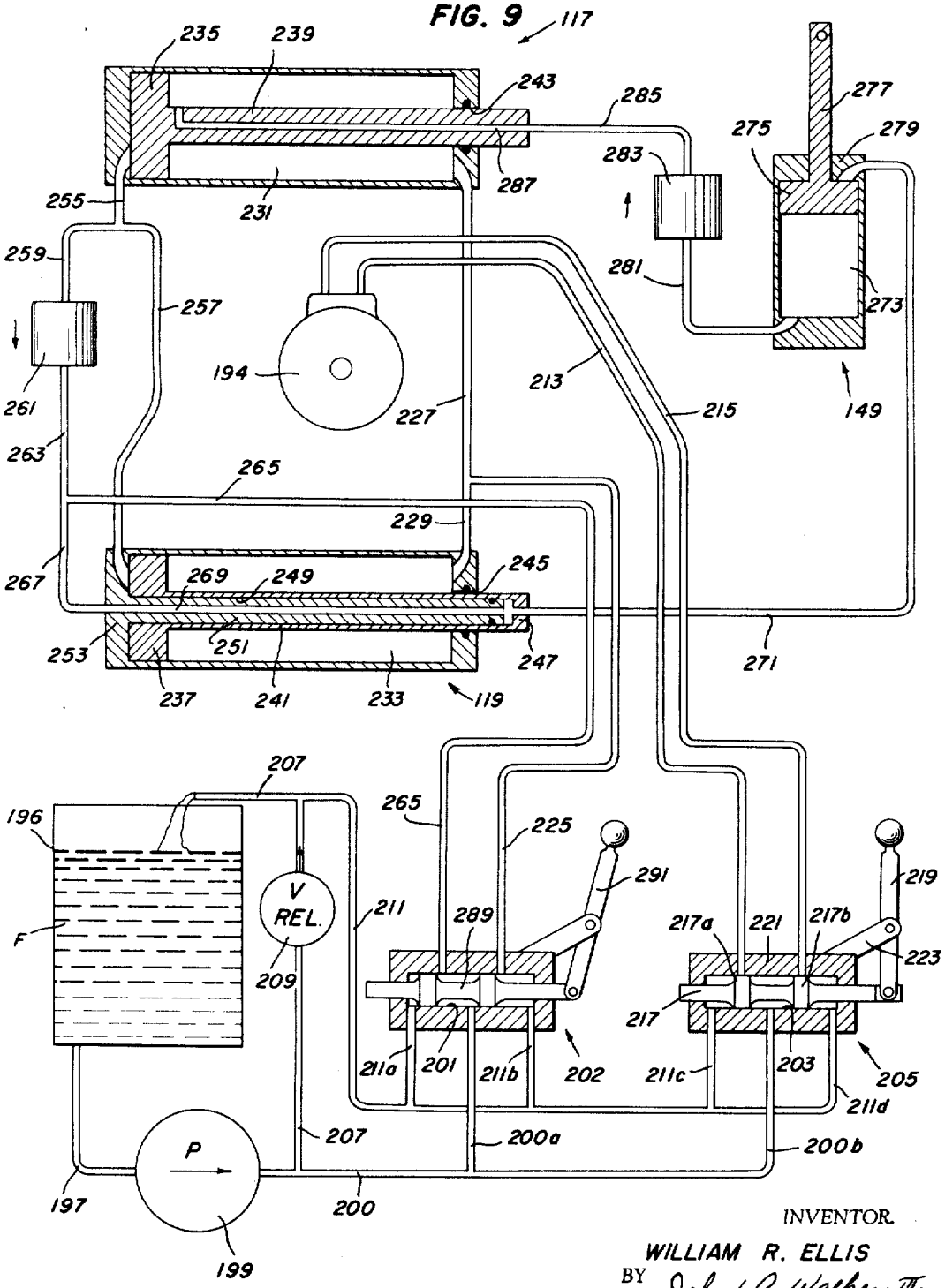
FIG. 9 is a schematic view of the hydraulic system of the present invention.

For purposes of clarity in the schematic diagram of FIG. 9, the passageways 213 and 215 have been shown as integral passageways, whereas actually the passageways are broken down into various portions between the valve 205 and the motor 194. Thus, the portion 213a leads from valve 205 to hub 41 where it is connected by a suitable fitting to portion 213b provided in the hub which leads to a portion 213c which is in the form of an annular groove around the periphery of spindle 45 from where a portion 213d in the form of a bore through the spindle leads to a point adjacent the back side 71 of forward plate 103. From portion 213d, a portion 213e in the form of a line leads to a fitting where the fluid passes through the front plate 55 to a portion 213f in the form of a line which is connected to the motor 194. Thus, all of the portions numbered 213 with the suffixes a through f form the segments of the passageway 213 and go together to make up the entire passageway. In a like manner, the passageway 215 is broken up into portions which have been designated by suffixes a through f to correspond to the similar portions of passageways 213.

Referring again to the schematic diagram shown in FIG. 9, a passageway 225 leads from chamber 201 of valve 202 and is divided into branches or passageways 227 and 229 at the opposite end thereof, which branches respectively lead into the forward end of the chambers 231 and 233 of the respective piston-cylinder assemblies 117, 119. Although the passageway 225 is shown as being integral in FIG. 9, actually the passageway is broken up into portions. Thus, a portion 225a leads from a valve 202 to a fitting on hub 41 which connects to a portion 225b in the form of a bore in the hub that leads to a portion 225c in the form of an annular groove in spindle 45 from which leads a portion 225d in the form of a bore through the spindle. Also, the passageway 227 is preferably in portions. Thus, a portion 227a, in the form of a bore in plate 55 leads from portion 225d to a fitting from where the portion 227b leads to the chamber 231. In like manner, the passageway 229 is in portions, with the portion 229a being in the form of a bore through plate 55 leading from portion 225d to a fitting and with a portion 229b leading to chamber 233 from portion 229a.

Th piston-cylinder assemblies 117, 119 respectively include pistons 235, 237 which respectively have piston rods 239, 241 attached to the forward central portions thereof and extend forwardly and slidably through apertures 243, 245 respectively provided in the forward end of the piston-cylinder assemblies with suitable sealing means being provided. The piston rod 241 is sleeve-like in construction and is closed off at the end thereof as at 247. Piston rod 241 has a central bore 249 that extends from end 247 throughout the length of the piston rod 241 and is extended through piston 237. An inner rod 251 is attached adjacent the central portion of the end 253 of piston-cylinder assembly 119 and extends into bore 249. In other words, the outer piston rod 241 is slidably and telescopically mounted on inner rod 251. By the use of this unique construction, the need for hose lines to the shoulder or plate 103 is eliminated.

A line 255 extends from chamber 231 on the rearward side of piston 235 opposite from passageway 227 and is branched, with one branch 257 leading to chamber 233 on the rearward side of piston 237 opposite from passageway 229, and the other branch 259 leads to a counter-balance valve 261 of usual construction. Valve 261 and valve 283 mentioned hereinafter are of conventional construction, well-known to those skilled in the art. A suitable valve construction for valves 261 and 283 is the counter-balance valve marketed by Fluid Controls, Inc., of 1284 No. Center Street, Mentor, Ohio, and which is shown in detail on sheets #2.50 and #2.52a of the catalog of said Fluid Controls, Inc. Valve 261 is arranged so that it normally acts as a check valve permitting flow through the valve in the direction shown by the arrow but preventing flow in the opposite direction unless a predetermined pressure is reached. From counter-balance valve 261, a line 263 leads and is branched with one branch or passageway 265 leading to the chamber 201 of control valve 202 and the other branch 267 leading to a central bore 269 through end 253 and inner piston rod 251. Passageway 265 is preferably in portions. Thus, a portion 265a leads from the valve 202 to hub 41 where a fitting connects it to a portion 265b in the form of a bore in the hub which leads to a portion 265c in the form of an annular groove in spindle 45 from where the portion 265d in the form of a bore through the spindle leads to a portion 265e in the form of a bore through the plate 55 which leads to a juncture with passageways 263 and 267. A line 271 leads from bore 249 adjacent end 247 to bore 273 of piston-cylinder assembly 149 with the entrance port being on the forward side of the piston 275 of the piston-cylinder assembly. A piston rod 277 is attached to the piston 275 and leads outwardly through a central bore in the end 279 of piston-cylinder assembly 149. A line 281 leads from chamber 273 on the opposite side of piston 275 from line 271 and to a counter-balance valve 283 which is similar to counter-balance valve 261. Valve 283 permits the normal flow of fluid through the valve in the direction shown by the arrow at the valve but limits flow of fluid in the opposite direction unless a predetermined pressure is reached. A line 285 leads from counter-balance valve 283 to a bore 287 provided through piston rod 239 and which bore enters into chamber 231.

Suitable sealing means, such as O-rings 288 are provided in grooves in spindle 45 between the spindle and hub 41, and on either side of the portions 213c, 215c, 225c, and 265c, to prevent oil flow longitudinally of the spindle. Valve 202 is constructed in a similar manner to valve 205 and includes piston 289 and lever 291 which correspond to piston 217 and lever 219, respectively. The operation of valve 202 also is similar to the operation of valve 205, and it will be understood that when pistons 237 and 239 are in a position to the left as shown in FIG. 9, the flow will be from the valve through passageway 265 and will be returned by passageway 225, and when the piston is moved to the right, the flow will be in the opposite direction. It will be noted that in FIG. 9 valve 205 is shown in neutral position, whereas valve 202 is shown in a position to the left.

It will be understood that when the piston-cylinder assemblies 117, 119 are in the retracted positions shown in FIG. 9, the clamp arm 105 will be in an inward position, as shown in broken lines as at 105a in FIG. 1, and when the piston-cylinder assemblies are extended, the clamp arm 105 will be in an outer position, as, for example, like that shown in solid lines in FIG. 1. Also, it will be understood that when the piston-cylinder assembly 149 is in an extended position, as shown in solid lines in FIG. 9, the clamp arm 105 will be swung inwardly towards the other clamp arm 81, and when the piston-cylinder assembly 149 is retracted, the clamp arm 105 will be swung outwardly, as shown in broken lines as at 105b in FIG. 1.

In describing the operation of the mechanism 11, it will be assumed that the piston-cylinder assemblies 117, 119, and 149 are in the positions shown in FIG. 9, so that the clamp arm 105 is in the position shown as at 105a in FIG. 1. Starting with the parts in the position above-described, and to make ready to pick up a roll R, the lever 291 is moved into the position shown in solid lines in FIG. 9 so that the flow of hydraulic fluid is from valve 202 through passageway 265. The flow will continue from passageway 265, through passageway 267 (but not through line 263 since it will be initially blocked by counter-balance valve 261), through bore 269, through line 271, whereupon it will force piston 275 into a retracted position of the piston-cylinder assembly 149, which in turn will swing clamp arm 105 outwardly, as heretofore described. The hydraulic fluid on the opposite side of piston 275 returns through the line 281, counter-balance valve 283, line 285, bore 287, chamber 231, passageway 227, passageway 225, chamber 201, line 211b, line 211, and line 207 to the tank 196. After the piston 275 has moved to its extreme position, the pressure will build up in line 271, passageway 267, passageway 265, and line 263 until the predetermined pressure is exceeded on valve 261 which will permit fluid to flow therethrough into line 259 and thence through lines 255 and 257 to the rearward sides of pistons 235, 237, whereupon the piston-cylinder assemblies 117, 119, will be simultaneously moved into extended positions to move the clamp arm 105 away from the clamp arm 81. It will be understood that the fluid on the forward sides of the pistons 235, 237 can return through passageway 227, passageway 229, passageway 225, chamber 201, lines 211b, 211 and 207 to the tank 196. From the foregoing, it will be seen that there is a sequential operation in opening the clamp mechanism 29 with the arm 105 first being swung outwardly and then moved laterally outwardly. In closing the clamp mechanism 29, substantially the reverse of the above sequential operation will take place. Thus, the clamp arm 105 will first move laterally inwardly and then the clamp arm will swing inwardly to contact the paper roll R and pull it in. The flow of hydraulic fluid in this latter operation is traced as follows: The piston 289 is moved to the right by lever 291 which allows fluid to flow from the valve 202 through passageway 225 to the forward sides of pistons 235, 237, which moves the pistons to the left and causes the piston assemblies 117, 119 to retract simultaneously. It will be understood that this is possible relative to piston-cylinder assembly 117 since fluid cannot escape through line 285 as it is initially blocked off by the counter-balance valve 283. Also, it will be understood that the fluid on the rearward sides of the pistons 235, 237 can escape through the lines 257, 255, 259, valve 261, line 263, passageway 165, chamber 201, line 211a, line 211, and line 207 to tank 196. After the piston-cylinder assemblies 117, 119 have been fully retracted or clamp arm 105 has made contact with roll R, the pressure begins to build up in line 285 until a predetermined pressure is reached, at which time the counter-balance valve 283 will allow the passage of fluid through the valve into line 281 which in turn will cause the piston-cylinder assembly 149 to extend and move the clamp arm 105 inwardly.

It should be noted, as best seen in FIG. 1, that the clamp arm 105 extends beyond arm 81 and the center of roll R so that the clamp arm has a tendency to pull the roll back towards the lift truck 13. This eliminates the necessity of the forward tilt of the lift truck to pick up a roll from the floor.

Figure 13:
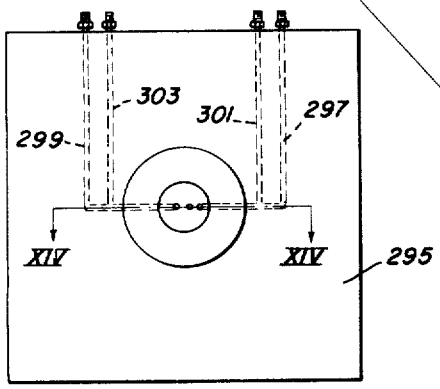
FIG. 13 is an elevational view of the back side of a modified back plate of the present invention.
Figure 11:
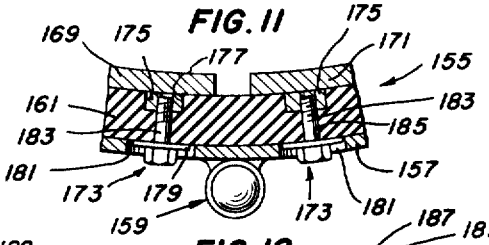
FIG. 11 is an enlarged sectional view taken as on the line XI—XI of FIG. 10.
Figure 14:
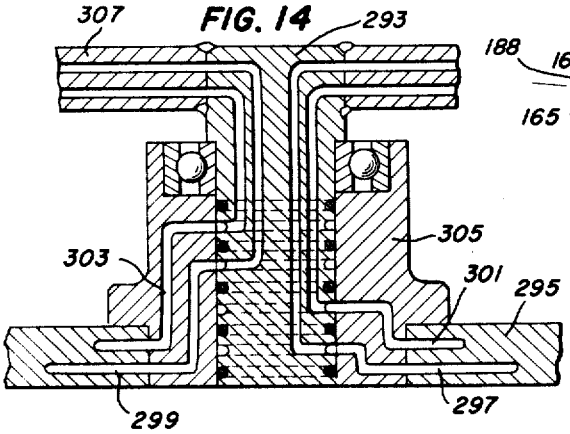
FIG. 14 is an enlarged fragmentary sectional view taken as on the line XIV—XIV of FIG. 13.

In the modified structure shown in FIGS. 13 and 14, the end of spindle 293, which corresponds to spindle 45, terminates flush with back plate 295 rather than extending beyond the back plate as in the previously described primary embodiment. Also, instead of having the fluid lines enter the portion of the hub extending rearwardly of the back plate as in the primary embodiment, the lines 297, 299, 301 and 303, which respectively correspond to the lines and passageways 213, 215, 225 and 265 of the primary embodiment, enter through the top of the back plate 295 and extend through bores in the plate itself, with portions extending through the hub 305, spindle 293, and front plate 307, as in the primary embodiment. Thus, by this means, the load-center loss can be reduced by an additional amount.

From the foregoing description, it can be seen that a very efficient and effective roll handling mechanism 11 is provided which offers many advantages over previous roll handling mechanisms. Thus, the load-center losses of the clamp of the present invention are greatly reduced over previous clamps. In addition, a very effective and improved construction concerning the hydraulic system is achieved by the present invention. Also, the mechanical storage of energy in the roll engaging pads is a very effective device for taking up the slack in the event of oil pressure being released. In addition, it will be seen that an overall improved mechanism is provided which departs extensively from the previous pattern in the industry of stacking one component on another.

Although the invention has been described in some detail by way of illustration and example for purposes of clarity or understanding, it is to be understood that it is not to be so limited since changes and modifications may be made therein which are within the full intended scope of this invention as hereinafter claimed.

I claim:

1. A lift truck with roll handling mechanism for use in handling rolls of paper and the like comprising in combination a self-powered mobile truck having a substantially vertical mast with portions of said mast being adapted for up and down movement, a back plate secured to said portions of said mast, a front plate, bearing means rotatably supporting said front plate from said back plate, roll clamping means including a pair of cooperative clamp arms, one of said clamp arms being mounted on said front plate, support means movably supporting the other of said clamp arms from said front plate for rectilinear movement towards and away from said one of said clamp arms and for swinging movement inward and outward relative to said one of said clamp arms, at least one piston-cylinder assembly interposed between said support means and said front plate for causing said rectilinear movement of said other of said clamp arms, an additional piston-cylinder assembly interposed between said support means and said other of said clamp arms for causing said swinging movement of said other of said clamp arms, and conduit means for supplying hydraulic fluid to said piston-cylinder assemblies and including a portion extending centrally through said first-mentioned piston-cylinder assembly.

2. A lift truck with roll handling mechanism for use in handling rolls of paper and the like comprising in combination a self-powered mobile truck having a substantially vertical mast with portions of said mast being adapted for up and down movement, a substantially flat first plate having a front side and a back side, means connecting said first plate to said portions of said mast with said back side of said first plate being contiguous with said mast, a substantially flat second plate having a front side and a back side and disposed outwardly from said front side of said first plate and substantially parallel therewith, bearing means between said first and second plates rotatably supporting said second plate from said first plate thereby defining an axis of rotation extending fore and aft substantially perpendicularly through said first and second plates, a first clamp arm fixedly attached to said second plate and extending from said front side of said second plate substantially perpendicular thereto and spaced from said axis of rotation, a second clamp arm extending substantially perpendicularly outwardly from said second plate, mounting means movably mounting said second clamp arm on said second plate for cooperative back and forth movement towards and away from said first clamp arm, said mounting means including at least two guide means disposed on opposite sides of said axis of rotation with the major portions of each thereof being disposed adjacent said back side of said second plate, first hydraulic actuating means connected to said second clamp arm for causing movement of said second clamp arm towards and away from said first clamp arm to respectively clamp or loosen a roll of paper and the like, second hydraulic actuating means powered from said mobile truck connected to said portions of said mast for up and down movement of said roll handling mechanism to lift a clamped roll of paper and the like, third hydraulic actuating means connected to said second plate for causing rotational movement of said second plate relative to said first plate to rotatably position a clamped and lifted roll of paper and the like, and conduit and valve means hydraulically connected to said actuating means.

3. A lift truck with roll handling mechanism for use in handling rolls of paper and the like comprising in combination a self-powered mobile truck having a substantially vertical mast with portions of said mast being adapted for up and down movement, a back plate secured to said portions of said mast, a front plate, bearing means rotatably supporting said front plate from said back plate, roll clamping means including a first clamp arm and a second cooperative clamp arm, said first clamp arm being mounted on said front plate, support means movably supporting said second clamp arm from said front plate for rectilinear movement thereof towards said first clamp arm and towards a roll of paper interposed between said clamp arms and for swinging movement inward relative to said second clamp arm and towards a roll of paper interposed between said clamp arms, a first piston-cylinder assembly interposed between said support means and said front plate for causing said rectilinear movement of said second clamp arm, a second piston-cylinder assembly interposed between said support means and said second clamp arm for causing said swinging movement of said second clamp arm, a counter-balance valve, source means for supplying hydraulic fluid under pressure, first conduit means leading from said source means to said counter-balance valve and one end of said first piston-cylinder assembly to cause said first piston-cylinder assembly to be actuated and move said second clamp arm towards said first clamp arm and towards the roll of paper interposed between said clamp arms, restriction of inward movement of said second clamp arm by contact with said roll of paper being effective to cause pressure to build up in said first conduit means to a predetermined point, said counter-balance valve being responsive to a buildup in pressure in said first conduit means to said predetermined point to allow hydraulic fluid to pass through said counter-balance valve, second conduit means leading from said counter-balance valve to said second piston-cylinder assembly for causing said second piston-cylinder assembly to be actuated when hydraulic fluid is passed through said counter-balance valve whereby said second clamp arm is caused to swing inwardly when said inward movement thereof is restricted.

*4. A lift truck with roll handling mechanism for use in handling rolls of paper and the like comprising in combination a self-powered mobile truck having a substantially vertical mast with portions of said mast being adapted for up and down movement, a first plate having a front side and a back side, means connecting said first plate to said portions of said mast with said back side of said first plate being contiguous with said mast, a second plate having a front side and a back side and disposed outwardly from said front side of said first plate in closely spaced substantially parallel relationship therewith, means rotatably supporting said second plate from said first plate thereby defining an axis of rotation extending fore and aft substantially perpendicular through said first and second plates, roll clamping means including a pair of cooperative clamp arms mounted on said second plate adjacent the front side thereof, a first gear concentric with said axis of rotation and fixedly attached to said first plate on the front side thereof between said first and second plates, a shaft, a second gear between said first and second plates fixedly mounted on said shaft and operably coupled to said first gear, means operably coupled to said shaft and fixedly mounted on said second plate outside of the space between said first and second plates for providing driving means to rotate said second plate relative to said first plate and yet permit a close spacing of said first and second plates for a low load center loss, one of said clamp arms being substantially fixed relative to said second plate, support means movably supporting the other of said clamp arms from said second plate for rectilinear movement towards and away from said one of said clamp arms and for swinging movement inward and outward relative to said one of said clamp arms, and a piston-cylinder assembly interposed between said support means and said other of said clamp arms for causing said swinging movement of said other of said clamp arms, guide means reacting between said second plate and said support means to guide said second plate rectilinearly relative to said support means, a portion of said guide means overlapping the space between said first and second plates.*

*5. A lift truck with roll handling mechanism for use in handling rolls of paper and the like comprising in combination a self-powered mobile truck having a substantially vertical mast with portions of said mast being adapted for up and down movement, a first plate having a front side and a back side, means connecting said first plate to said portions of said mast with said back side of said first plate being contiguous with said mast, a second plate having a front side and a back side and disposed outwardly from said front side of said first plate in closely spaced substantially parallel relationship therewith, means rotatably supporting said second plate from said first plate thereby defining an axis of rotation extending fore and aft substantially perpendicular through said first and second plates, roll clamping means including a pair of cooperative clamp arms mounted on said second plate adjacent the front side thereof, a first gear concentric with said axis of rotation and fixedly attached to said first plate on the front side thereof between said first and second plates, a shaft, a second gear between said first and second plates fixedly mounted on said shaft and operably coupled to said first gear, means operably coupled to said shaft and fixedly mounted on said second plate outside of the space between said first and second plates for providing driving means to rotate said second plate relative to said first plate and yet permit a close spacing of said first and second plates for a low load center loss, said means operably coupled to said shaft being disposed on the front side of said second plate adjacent one of said clamp arms to the outside of at least a portion of the clamping surface.*

*6. The lift truck of claim 5 in which said means operably coupled to said shaft comprises a hydraulic motor and in which is provided means for supplying hydraulic fluid to said hydraulic motor including a hydraulic tank located on said lift truck, a hydraulic pump, hydraulic control means; pipe means operably connecting said tank, said pump and said control means; and passageway means leading from said control means to said hydraulic motor with a portion of said passageway means extending through said means rotatably supporting said second plate from said first plate.*

References Cited

The following references, cited by the Examiner, are of record in the patented file of this patent or the original patent.

UNITED STATES PATENTS

| | | | |
|---|---|---|---|
| 2,335,572 | 11/1943 | Schroeder | 214—652 X |
| 2,595,131 | 4/1952 | Ehmann | 214—653 X |
| 2,604,220 | 7/1952 | Frischmann | 214—652 |
| 2,609,114 | 9/1952 | Backofen | 214—652 |
| 2,635,774 | 4/1953 | Backofen | 214—652 |
| 2,699,879 | 1/1955 | Bertram | 214—653 |
| 2,732,083 | 1/1956 | Smith | 214—658 |
| 2,810,488 | 10/1957 | Arnot | 214—652 |
| 2,815,878 | 12/1957 | Vance | 214—652 |
| 2,886,197 | 5/1959 | Harris | 214—653 |
| 2,984,985 | 5/1961 | McMillin | 60—97 |
| 3,008,596 | 11/1961 | Oster | 214—653 |
| 3,092,274 | 6/1963 | Harris | 214—653 |

FOREIGN PATENTS

| | | |
|---|---|---|
| 903,555 | 2/1954 | Germany. |

GERALD M. FORLENZA, *Primary Examiner.*

R. B. JOHNSON, *Assistant Examiner.*